Patented Apr. 29, 1952

2,595,196

UNITED STATES PATENT OFFICE 2,595,196

PTERINS AND PRODUCTION OF THE SAME

Martin E. Hultquist, Bound Brook, and James M. Smith, Jr., North Plainfield, N. J., assignors to American Cyanamid Company, New York, N. Y., a corporation of Maine No Drawing. Application March 5, 1948, Serial No. 13,344

8 Claims. (Cl. 260—251.5)

This invention relates to new organic compounds and to processes of preparing the same.

The recent discovery of the structure of folic acid and the development of commercial methods for its synthesis have made this compound available in medicine, where it has shown remarkable vitamin-like activity in stimulating the formation of hemoglobin and in the treatment of sprue and other diseases. Because of the known value of some anti-vitamins or vitamin antagonists in medicine, for example, the sulfa drugs, it is desirable that compounds having antagonistic activity to folic acid be made. The present invention is concerned with new organic compounds which have such antagonistic activity.

The new compounds of the present invention may be represented by the following general formula

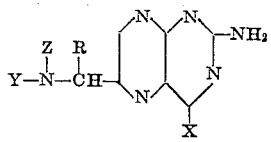

in which R is a lower alkyl radical, X is a hydroxyl, a thiol or an amino radical, Y is an aromatic or substituted aromatic radical, and Z is hydrogen or an aliphatic radical.

The new compounds represented by the above formula may be prepared by the reaction of a 2,4,5 - triamino - 6 - hydroxypyrimidine, a 2,2,3-trihalo-alkylaldehyde having at least four carbon atoms and a primary or secondary amine. The reaction may be caused to take place by simply mixing together the three reactants just named, simultaneously or in any desired order. In some cases partial reaction between the aldehyde and the primary or secondary amine or the aldehyde and the triaminopyrimidine seems to give best results.

The reaction takes place under a wide range of pH conditions from about pH 2 up to pH 9 and even outside these ranges. The best results are obtained at a pH within the range of about 3 to 5. Buffering agents, acids or alkalis may be added to the reaction as necessary to maintain the pH as desired.

It is preferred that the reaction take place in a solvent in which the reactants are soluble or partially soluble, such as alcohol, benzene, acetic acid, water or mixtures thereof. The temperature of the reaction may be from 0° C. up to 60° C. or even higher.

The 2,2,3-trihaloalkylaldehyde may be one of several having at least four carbon atoms, as, for example, butylchloral (2,2,3-trichlorobutanal) and other related compounds such as 2,2,3-tribromobutanal, 2,2,3 - trichloropentanal, 2,2,3-trichloroheptanal, and the like. We prefer to use butylchloral because this compound when reacted with 2,4,5-triamino-6-hydroxypyrimidine and p-aminobenzoylglutamic acid gives a product most closely related to folic acid but having a marked and completely reversible antagonistic action thereto.

As indicated above, the preferred 2,4,5-triaminopyrimidine is 2,4,5-triamino-6-hydroxypyrimidine, although other triaminopyrimidines such as 2,4,5-triamino-6-thiopyrimidine, 2,4,5,6-tetraaminopyrimidine, and the like, may also be used in the reaction to yield new and useful compounds having anti-folic acid activity. Obviously, the salts of these pyrimidines may be used in the reaction as well as the free base. Tautomeric forms of these pyrimidines may also be used, where such exist.

A wide variety of primary and secondary amines may be used in the reaction whereby new compounds are obtained. Such amines include aniline, aminobenzoic acid, and the salts, esters and amides thereof, including particularly the amino acid amides of p-aminobenzoic acid, such as p-aminobenzoylglutamic acid, p-aminobenzoylaspartic acid, p-aminobenzoyl-glycine, and other amino acid amides of p-aminobenzoic acid in which the amide forming group is made up of one or more amino acid radicals.

The salts and esters of these amino acid amides may also be used in the process without substantial modification thereof. Secondary amines which may be used include methylaniline, p-methylaminobenzoic acid, p-ethylaminobenzoic acid, p-benzylamino-benzoic acid, and the amino acid amides of the latter, such as p-methylaminobenzoylglutamic acid, p-methylaminobenzoylaspartic acid, and still others, many of which are illustrated in the specific examples which follow. Obviously, the resulting products, all of which differ structurally from folic acid, also differ in their antagonistic action thereto.

The invention will now be described in greater particularity by means of the following specific examples in which representative compounds having the specific structure illustrated above are prepared. All parts are by weight unless otherwise specified.

Example 1

30.8 parts of 2,4,5-triamino-6-hydroxypyrimidine sulfate, 29.3 parts of barium chloride dihydrate and 600 parts of water are heated to 60° C. for a few minutes, then cooled to 40° C. 13.3 parts of p-aminobenzoylglutamic acid are added, and the pH adjusted to 3. During 25 minutes 17.5 parts of butylchloral (2,2,3 - trichlorobutanal) are added along with caustic to maintain a pH of 3. After an additional half hour of stirring, the mixture is cooled, filtered and dried. Yield 49.1 parts; chemical assay 18% real.

The crude product obtained above may be purified by the following procedure. Three parts (real) of the crude material are slurried with 6 parts of lime in 3,000 parts of water, heated to 60° C. and clarified. The filtrate is adjusted to pH 10.8 with aqueous zinc chloride and again clarified. A zinc salt is precipitated by the addition of zinc chloride to pH 6.8 at 80° C. and is filtered hot. The zinc salt cake is slurried with 3,000 parts of water with caustic to bring the pH to about 12. The slurry is again adjusted to pH 6.8 with zinc chloride and filtered. A third zinc salt is prepared in the same way. The cake is then slurried with 4.5 parts of lime and 700 parts of water at 90° C., clarified, acidified to pH 3, cooled and filtered. The cake is slurried with 6 parts of magnesium carbonate and 450 parts of water at 90° C. 1.5 parts of Darco are added and the slurry clarified, acidified to pH 3, cooled and filtered. Yield 1.81 parts, chemical assay—79% real.

The partially purified product, 75%–82% pure by chemical assay (4 parts real), is slurried with 2,000 parts of water, 8 parts of magnesium carbonate and 4 parts of Darco (brand of activated carbon) at 80° C., clarified, acidified to pH 3, cooled and filtered. The yield of dried product is 3.53 parts, chemical assay 87.6% real. Its structural formula is

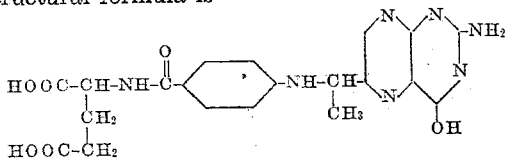

A repetition of this treatment gives a product 91.4% real (by chemical assay) in about the same yield.

A solution of 0.3 part of N-[4-{[1-(2-amino-4-hydroxy-6-pteridyl) ethyl] amino} benzoyl] glutamic acid (91.4% real), prepared above, in 90 parts of 1 N sodium hydroxide is heated to 95° C. and treated with aqueous potassium permanganate in small portions until the permanganate color persists. The mixture is decolorized with a little sodium hyposulfite, clarified and acidified to pH 2.5–3.0. The dry product weighs 0.128 part. A study of the ultraviolet absorption data indicates the presence of 6-substituted pterins, largely 2-amino-4-hydroxypteridine-6-carboxylic acid. The oxidation product contains no 2-amino-4-hydroxypteridine-7-carboxylic acid and no 2-amino-4-hydroxypteridine-6,7-dicarboxylic acid.

*Example 2*

A slurry of 26 grams 2,4,5,6-tetraaminopyrimidine sulfate dihydrate, 24 grams barium chloride dihydrate in 700 cc. water is heated at 60° C. for 10 minutes, cooled to 40° C., and treated with 7.5 g. p-methylaminobenzoic acid. After adjustment to pH 3.5–4.0, simultaneous addition of 17.5 grams of butylchloral in 30 cc. acetic acid and 50% sodium hydroxide solution was begun. The materials are added over 30 minutes with the pH being maintained at 3.5–4.0, and the temperature at 40°–43° C. After cooling overnight, the crude is isolated by filtration.

One-half of the above crude is slurried in one liter of water containing 4.5 grams lime. The mixture is heated at 60° C. for 40 minutes, filtered, and washed with 350 cc. water at 60° C. The pH of the filtrate is then adjusted to 10.8–11.0 with 10% zinc chloride solution. After filtering, the filtrate is adjusted to pH 3.5–4.0 with dilute hydrochloric acid and cooled in the ice-box overnight. The precipitated material, isolated by filtration, is slurried in 750 cc. of water, heated to 60° C with enough caustic to reach pH 11.2–11.5, and held at 60° C. for 10 minutes. Then carbon dioxide is bubbled through the solution with simultaneous cooling until pH 6.8–7.0 is reached at 20° C. The filtered solution is then adjusted to pH 3.5–4.0 with dilute hydrochloric acid and cooled in the ice-box overnight. The precipitate, after filtration, is slurried in 750 cc. water containing enough lime to give pH 8.6–9.2 at 60° C. After stirring with Darco G–60 for 15 minutes at 60° C., the filtered solution is adjusted to pH 3.5–4.0 and cooled overnight. The purified material is isolated by filtration. It has the formula

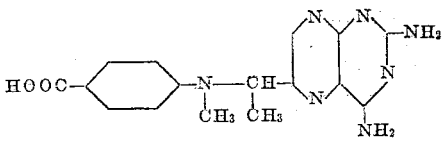

and as such is called 4{N-[1-(2,4-diamino-6-pteridyl) ethyl]-N-methylamino}-benzoic acid.

*Example 3*

N - [4 - {N - [1 - (2,4 - diamino - 6 - pteridyl) - ethyl] - N - methylamino}benzoyl] - glutamic acid is prepared as in the preceding example except that 16.2 grams disodium p-methylaminobenzoylglutamic acid are used in place of p-methylaminobenzoic acid.

*Example 4*

4 - {N - [1 - (2 - amino - 4 - hydroxy - 6 - pteridyl) ethyl] - N - methylamino} - benzonic acid having the formula

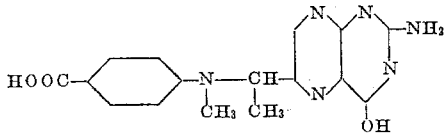

is prepared by a procedure similar to that described in Example 2 above, except that 2,4,5-triamino-6-hydroxypyrimidine is substituted for 2,4,5,6-tetraaminopyrimidine.

*Example 5*

N - [4 - {N - [1 - (2 - amino - 4 - hydroxy - 6 - pteridyl) ethyl] - N - methylamino} - benzoyl - glutamic acid having the formula

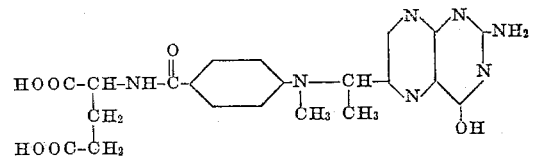

is prepared by a procedure similar to that described in Example 3 above, except that 2,4,5-triamino-6-hydroxypyrimidine is substituted for the tetraaminopyrimidine.

*Example 6*

N - [4 - {[1 - (2,4 - diamino - 6 - pteridyl) - ethyl]amino}benzoyl]glutamic acid having the formula

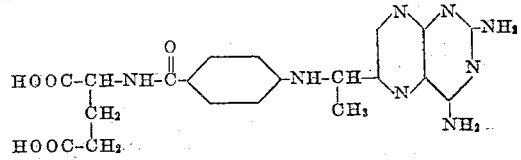

is prepared as follows:

A mixture of 32.9 parts of 2,4,5,6-tetraaminopyrimidine sulfate dihydrate, 29.3 parts of barium chloride dihydrate and 600 parts of water is heated to 60° C. and then cooled to 40° C. 13.3 parts of p-amino-benzoylglutamic acid are added and the pH adjusted to 3. A solution of 17.5 parts of butylchloral in 25 parts of glacial acetic acid is added during 20 minutes at 40°-45° C. with caustic to maintain pH 2.8-3.0. The mixture is stirred at the same temperature and pH for an additional ½ hour and is then cooled, filtered and dried. Yield, 46 parts, chemical assay 11.9% real.

The crude product (5 parts real) is slurried with 10 parts of lime and 2,000 parts of water at 80° C., clarified and washed with hot water. The filtrate is adjusted to pH 10.6 with aqueous zinc chloride solution, clarified, acidified to pH 4, cooled and filtered. The cake is slurried with 2,500 parts of water at 80° C. and caustic to pH 12. The mixture is then cooled slowly, treated with carbon dioxide gas to pH 7 at 20° C., clarified, acidified to pH 4, cooled and filtered. The cake is slurried with 5 parts of magnesium carbonate, 2.5 parts of Darco and 1,000 parts of water at 80° C., clarified, acidified to pH 4, cooled, filtered and dried. Yield, 1.662 parts, chemical assay, 69.3% real.

*Example 7*

N - [4 - {[1 - (2,4 - diamino - 6 - pteridyl) - ethyl]amino}benzoyl]aspartic acid having the formula

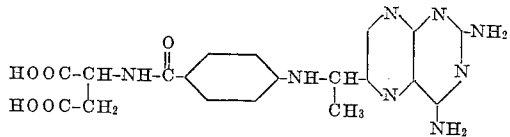

is prepared by a procedure similar to that described in Example 6 above, using p-aminobenzoylaspartic acid in place of p-aminobenzoylglutamic acid.

We claim:

1. Compounds having the general formula

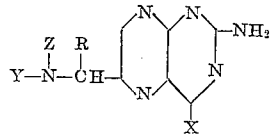

in which R is a lower alkyl radical, X is a member of the group consisting of hydroxyl, thiol and amino radicals, Y is a benzoyl radical and Z is a member of the group consisting of hydrogen and alkyl radicals.

2. Compounds having the general formula

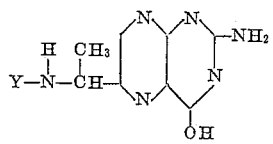

in which Y is a benzoyl radical.

3. The compound having the formula

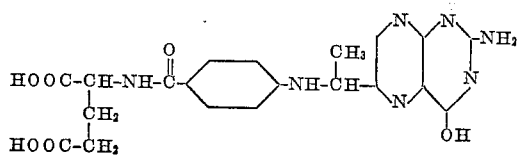

4. The compound having the formula

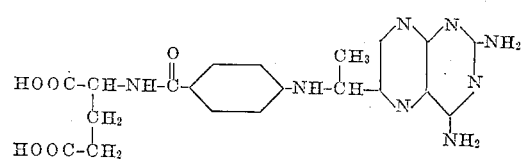

5. The compound having the formula

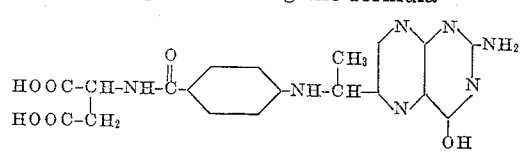

6. A method which comprises mixing together under reactive conditions a 2,4,5-triaminopyrimidine, a 2,2,3-trihaloalkylaldehyde having at least 4 carbon atoms and a member of the group consisting of primary and secondary amines and after reaction thereof recovering a compound having the formula

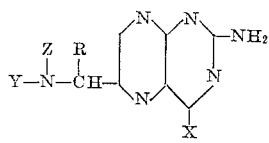

in which R is a lower alkyl radical, X is a member of the group consisting of hydroxyl, thiol and amino radicals, Y is a benzoyl radical and Z is a member of the group consisting of hydrogen and alkyl radicals.

7. A method which comprises mixing together under reactive conditions a 2,4,5-triamino-6-hydroxypyrimidine, 2,2,3-trichlorobutanal, and p-aminobenzoylglutamic acid, and after reaction thereof recovering a compound having the formula

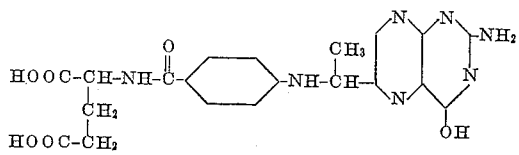

8. A method which comprises mixing together under reactive conditions a 2,4,5,6-tetraaminopyrimidine, 2,2,3 - trichlorobutanal, and p-aminobenzoylglutamic acid, and after reaction thereof recovering a compound having the formula

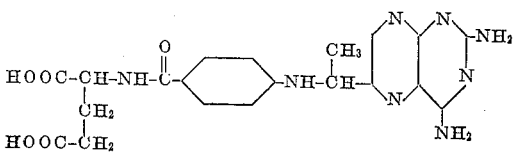

MARTIN E. HULTQUIST.
JAMES M. SMITH, Jr.

REFERENCES CITED

The following references are of record in the file of this patent:

UNITED STATES PATENTS

| Number | Name | Date |
|---|---|---|
| 2,444,002 | Boothe | June 22, 1948 |

OTHER REFERENCES

Hackh: Chemical Dictionary, p. 412, (1944 edition), The Blakiston Company, Philadelphia, Pa.